US012337589B2

(12) United States Patent
Khoo

(10) Patent No.: US 12,337,589 B2
(45) Date of Patent: Jun. 24, 2025

(54) LIQUID DISCHARGE APPARATUS

(71) Applicant: Er Sin Khoo, Kanagawa (JP)

(72) Inventor: Er Sin Khoo, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 106 days.

(21) Appl. No.: 18/490,193

(22) Filed: Oct. 19, 2023

(65) Prior Publication Data

US 2024/0157710 A1 May 16, 2024

(30) Foreign Application Priority Data

Nov. 11, 2022 (JP) ................................ 2022-181184

(51) Int. Cl.
*B41J 11/00* (2006.01)

(52) U.S. Cl.
CPC .... *B41J 11/00218* (2021.01); *B41J 11/00214* (2021.01)

(58) Field of Classification Search
CPC ...................... B41J 11/00218; B41J 11/00214
See application file for complete search history.

(56) References Cited

U.S. PATENT DOCUMENTS

| | | | | |
|---|---|---|---|---|
| 4,747,710 A | 5/1988 | Iwata et al. | | |
| 4,824,267 A | 4/1989 | Nakajima | | |
| 4,874,264 A | 10/1989 | Suzuki et al. | | |
| 2016/0193851 A1* | 7/2016 | Childers | B41J 2/47 | 250/492.1 |

FOREIGN PATENT DOCUMENTS

| | | |
|---|---|---|
| JP | 2009-172937 A | 8/2009 |
| JP | 2010-000735 A | 1/2010 |
| JP | 2019-001034 A | 1/2019 |
| JP | 2022-017731 A | 1/2022 |
| JP | 2022-030404 A | 2/2022 |
| JP | 2022-054679 A | 4/2022 |

OTHER PUBLICATIONS

U.S. Appl. No. 06/935,300, filed Nov. 26, 1986.
U.S. Appl. No. 07/398,269, filed Aug. 23, 1989.

* cited by examiner

*Primary Examiner* — Bradley W Thies
(74) *Attorney, Agent, or Firm* — IPUSA, PLLC

(57) ABSTRACT

A liquid discharge apparatus includes: a discharger to discharge liquid onto a surface of a record medium; a irradiator aligned in a first direction with the discharger, the irradiator to irradiate the liquid discharged on the record medium with an ultraviolet light beam; a first mover to move the irradiator in a second direction orthogonal to the first direction; and a second mover to move the irradiator in a third direction orthogonal to the first direction and the second direction.

11 Claims, 18 Drawing Sheets

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-181184, filed on Nov. 11, 2022, in the Japan Patent Office, the entire disclosure of which is hereby incorporated by reference herein.

BACKGROUND

Technical Field

The present disclosure relates to a liquid discharge apparatus.

Related Art

A liquid discharge apparatus for discharging ink which cured by ultraviolet light emitted from the ink discharge head is known. The liquid discharge apparatus includes a configuration including an ultraviolet irradiation device for irradiating the discharged ink with ultraviolet light at both ends of the head.

There is a case where the time period from the time when the ink lands on the medium (i.e., ink landing) to the time when the ink is irradiated with ultraviolet light (i.e., irradiation of ultraviolet light) is different between the outward path and the return path. Thus, an irradiation device for irradiating the ink with ultraviolet light can be inclined toward the print head in the main-scanning direction so as to change the irradiation position. In such a way, a technique in which the irradiation time from the ink landing to the irradiation of ultraviolet light is made to be approximately the same in the outward path and the return path to reduce the uneven luster is known.

SUMMARY

A liquid discharge apparatus includes: a discharger to discharge liquid onto a surface of a record medium; a irradiator aligned in a first direction with the discharger, the irradiator to irradiate the liquid discharged on the record medium with an ultraviolet light beam; a first mover to move the irradiator in a second direction orthogonal to the first direction; and a second mover to move the irradiator in a third direction orthogonal to the first direction and the second direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
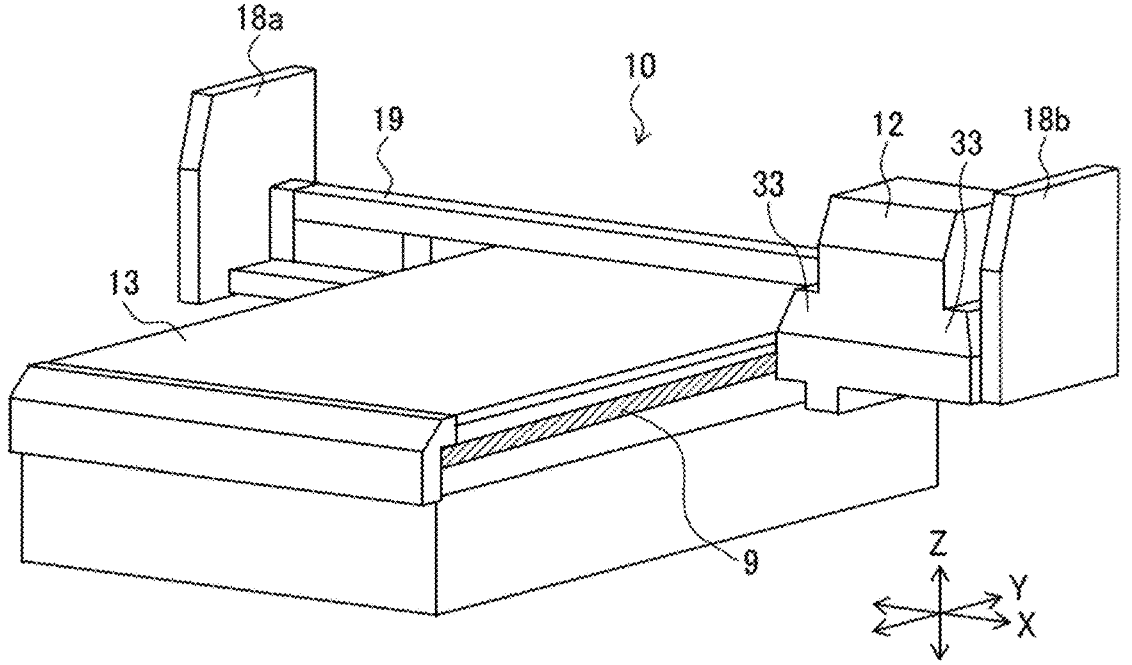
FIG. 1 is a front view of an overall configuration of a record apparatus.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in an equivalent manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present disclosure, finishing accuracy can be increased.

Embodiment will be described with reference to the drawings. The embodiments are not limited to the specific examples described below.

Configuration Example of Liquid Discharge Apparatus

An ink jet record apparatus (referred to as "record apparatus 10" below) illustrated in FIGS. 1 to 3 will be described as an example of a liquid discharge apparatus. Further, the liquid will be described as an example of ultraviolet (UV) ink (simply referred to as "ink" below) which is cured when exposed to a ultraviolet light beam. Thus, the head in the following example is a clear ink (Cl) head (simply referred to as "head" below). Further, an example in which the record medium is a sheet (e.g., paper) will be described.

FIG. 1 is a front view of an overall configuration of a record apparatus.

Figure 2:
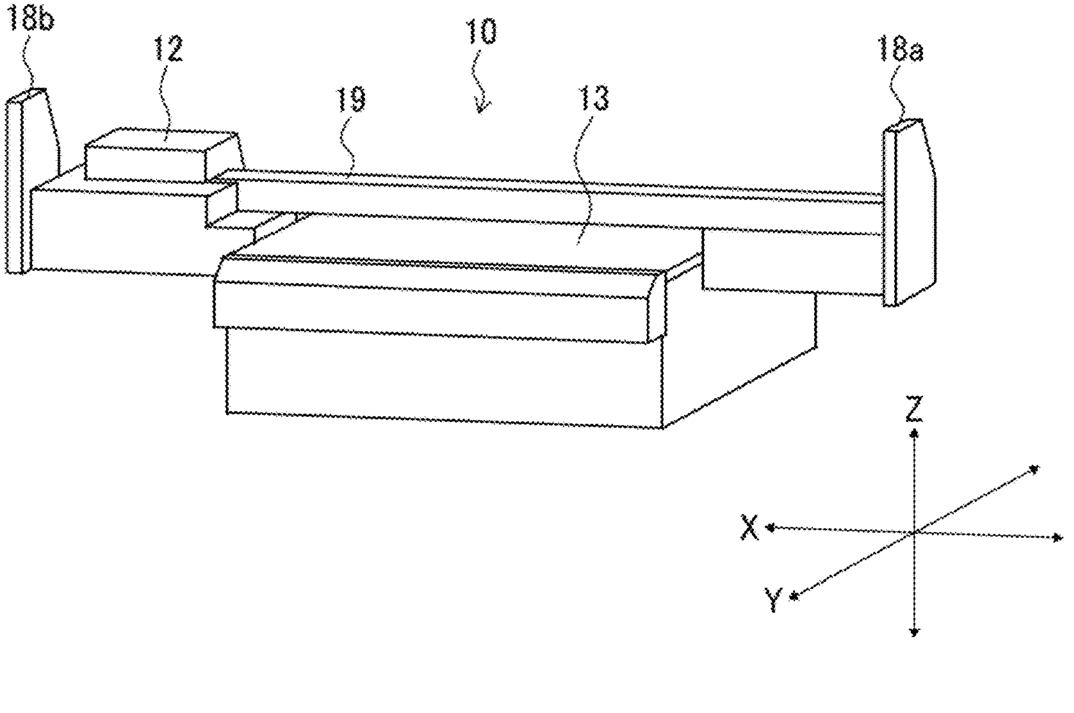
FIG. 2 is a rear view of the overall configuration of the record apparatus.

FIG. 2 is a rear view of the overall configuration of the record apparatus.

Figure 3:
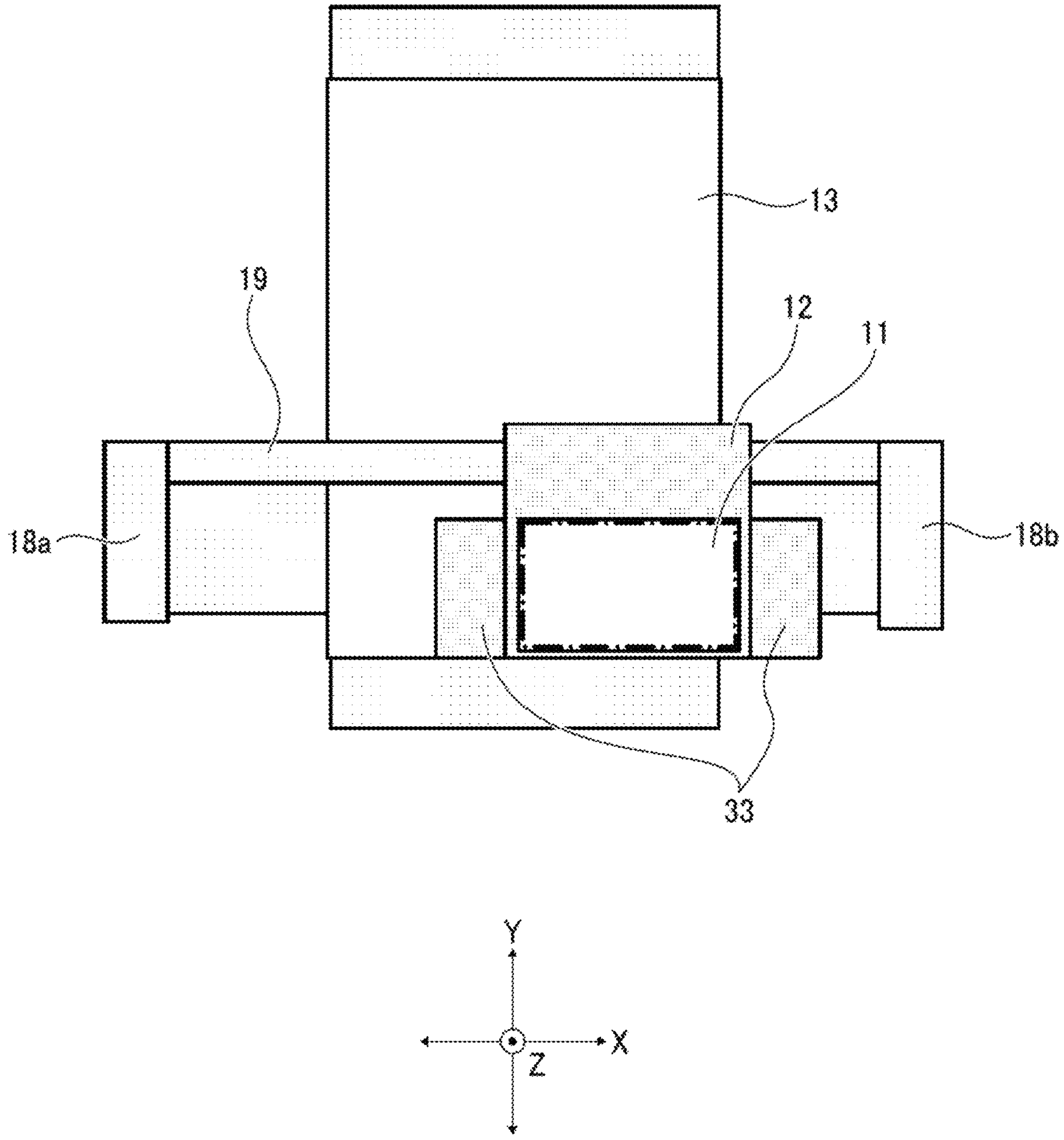
FIG. 3 is a top view of the overall configuration of the record apparatus.

FIG. 3 is a top view of the overall configuration of the record apparatus.

The horizontal direction is referred to as the "X-direction" and an example of the "first direction". In the following example, the X-direction is also the main-scanning direction.

A direction orthogonal to the X-direction is referred to as a "Y-direction" and an example of a "second direction". In the following example, the Y-direction is also the sub-scanning direction.

Accordingly, the XY-plane coincides with the plane of the sheet to be placed on a stage 13.

A direction perpendicular to the surface of the sheet (i.e., the XY-plane,), is referred to as "Z-direction" and an example of a "third direction". The Z-direction is also referred to as a height direction.

The first direction is defined as the –X-direction, and the first direction coincides with a direction in which the head and an irradiator (i.e., irradiator 33) for emitting ultraviolet light are arranged. As described above, the first direction is determined by the positional relation between the head and the irradiator 33.

In the front view in FIG. 1, the X-direction is the "left and right" direction. The Y-direction is the "front and back" direction. The Z-direction is the "up and down" direction.

The record apparatus 10 includes a carriage 12 and the stage 13 on which a record medium is mounted. The stage 13 and the sheet on the stage 13 are fixed in a position, and the carriage 12 is moved and rotated (e.g., a mover and a rotator). The surface of the record medium is illustrated to be the same as the surface of the stage 13 for the sake of simplicity.

The carriage 12 includes multiple record heads (referred to as "liquid discharge head" or "record head" below) including multiple nozzles.

The record head discharges ink from the nozzles to record dots and form an image. Further, the ink is cured when the ink is irradiated with ultraviolet light.

The nozzle is disposed in a position facing the stage 13.

The irradiator 33 includes a light source for emitting a ultraviolet light beam. The irradiator 33 emits a light beam having a wavelength for curing the ink discharged from the nozzle. The irradiator 33 and the carriage 12 are disposed as one body, and the irradiator 33 moves together with the record head in the X-direction, Y-direction, and Z-direction by parallel movement of the carriage 12.

A gantry 19 is mounted on the left-side plate 18*a* and the right-side plate 18*b*.

The carriage 12 moves in the X-direction, Y-direction, and Z-direction. Thus, the record apparatus 10 may have an actuator or a mechanism component for movement on each axis.

The movement in the X-direction is achieved by moving the carriage 12 along a guide rail disposed on the gantry 19.

The movement in the Y-direction is achieved by moving the carriage 12 along guide rails 9 disposed on the left and right sides of the stage 13.

The movement in the Z-direction is achieved by a mechanism for raising and lowering (lifting) the carriage 12.

The movement in the X-direction, the Y-direction, and the Z-direction may be achieved by a configuration other than the above. Thus, as long as the carriage 12 can move in the X-direction, the Y-direction, and the Z-direction in spite of the type of the actuator and the mechanism component that perform the parallel movement. Further, there may be a degree of freedom other than the above.

In the example described above, the carriage 12 moves in the X-direction, the Y-direction, and the Z-direction. However, the stage 13 or the sheet may move in one or two directions or with respect to another degree of freedom so that the position of the carriage 12 can move relative to the sheet.

Configuration Example of Head

Figure 4:
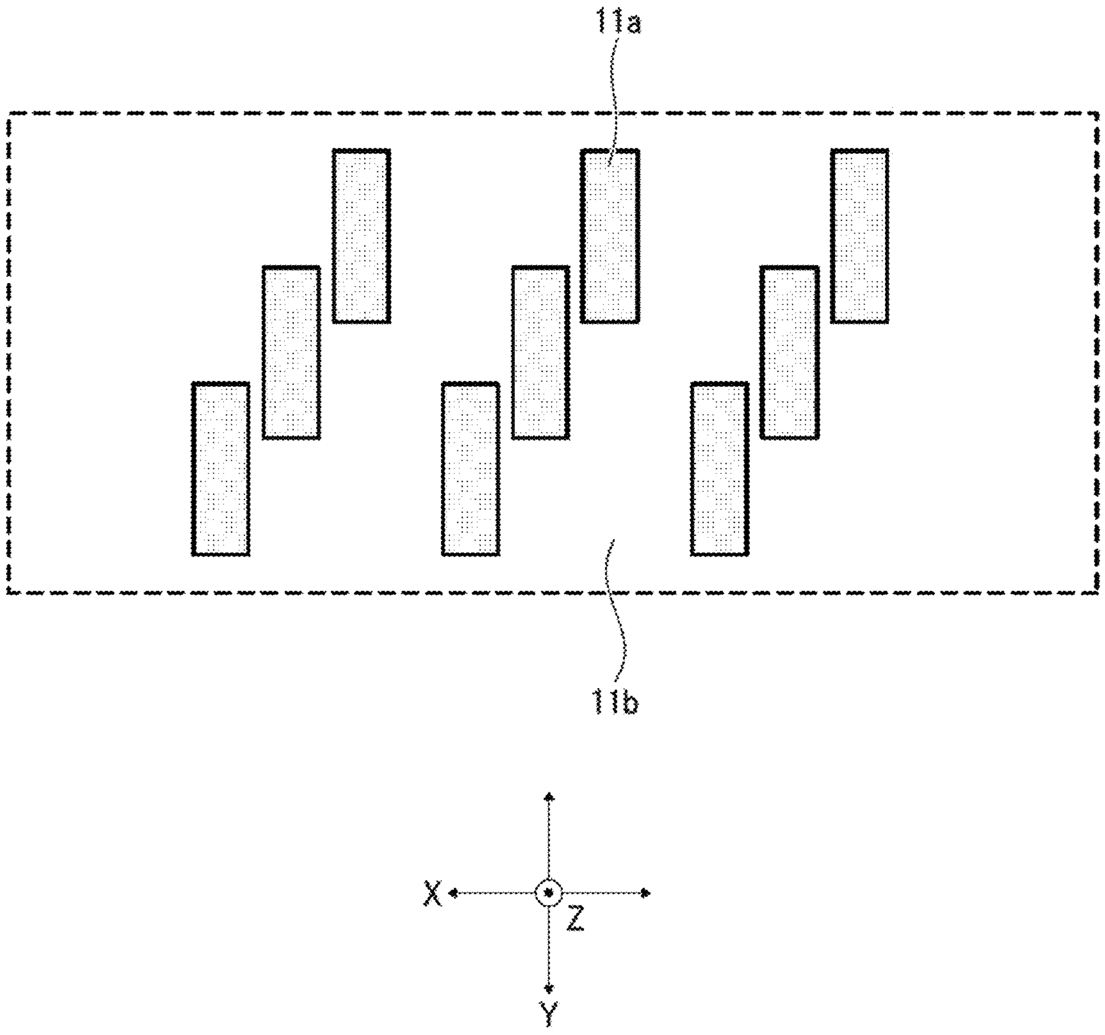
FIG. 4 is a diagram of an arrangement of heads in a head member.

FIG. 4 is a diagram of an arrangement of heads in a head member. For example, the head member 11 preferably includes multiple heads 11*a*. Specifically, the multiple heads 11*a* are arranged in a staggered pattern. However, the arrangement, shape, and number of the multiple head 11*a* may be other than those described above. Each of the multiple heads 11*a* is arranged on the head plate 11*b*.

Figure 5:
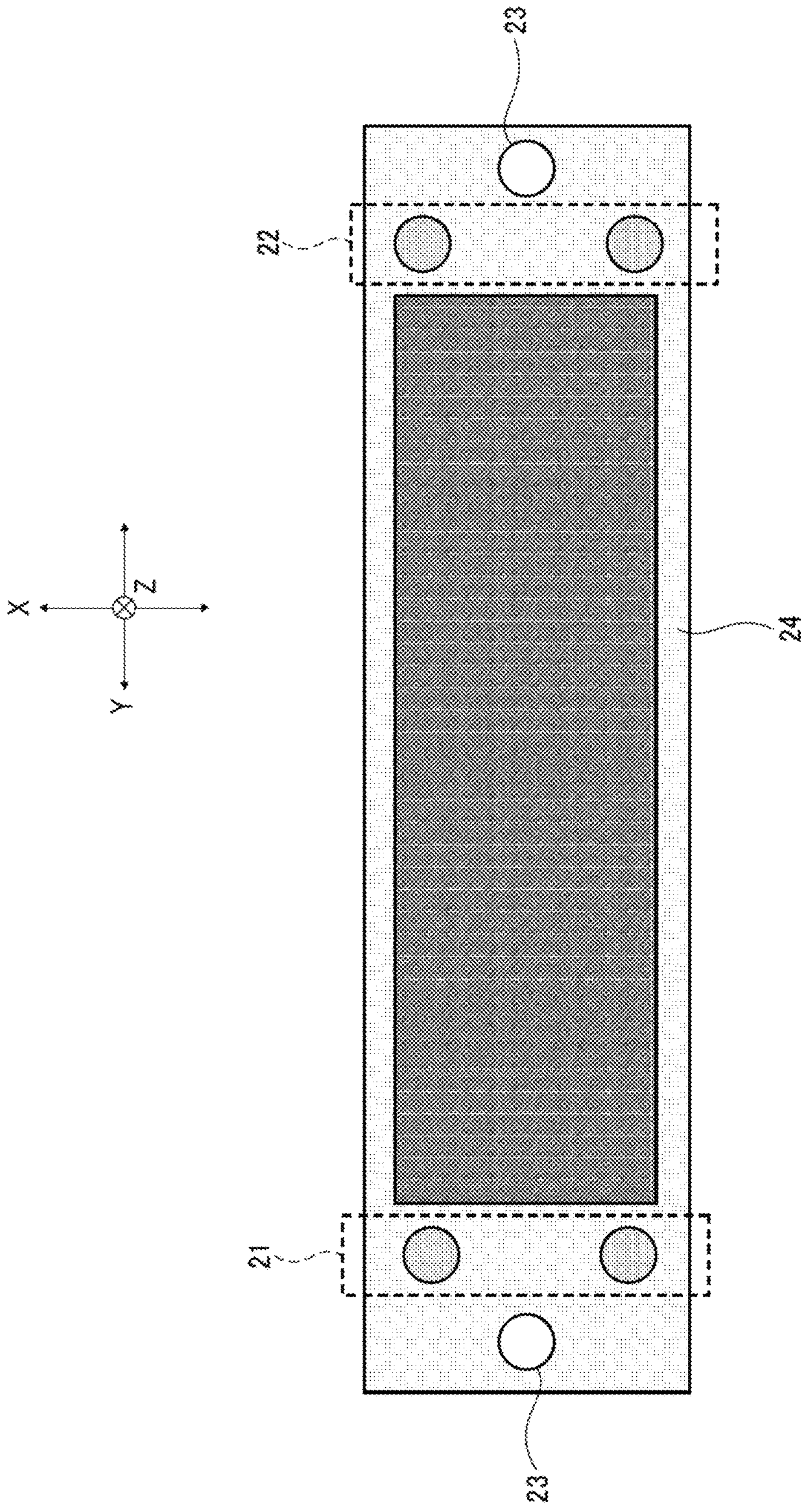
FIG. 5 is a top view of a configuration of the head.

FIG. 5 is a top view of a configuration of the head.

Figure 6:
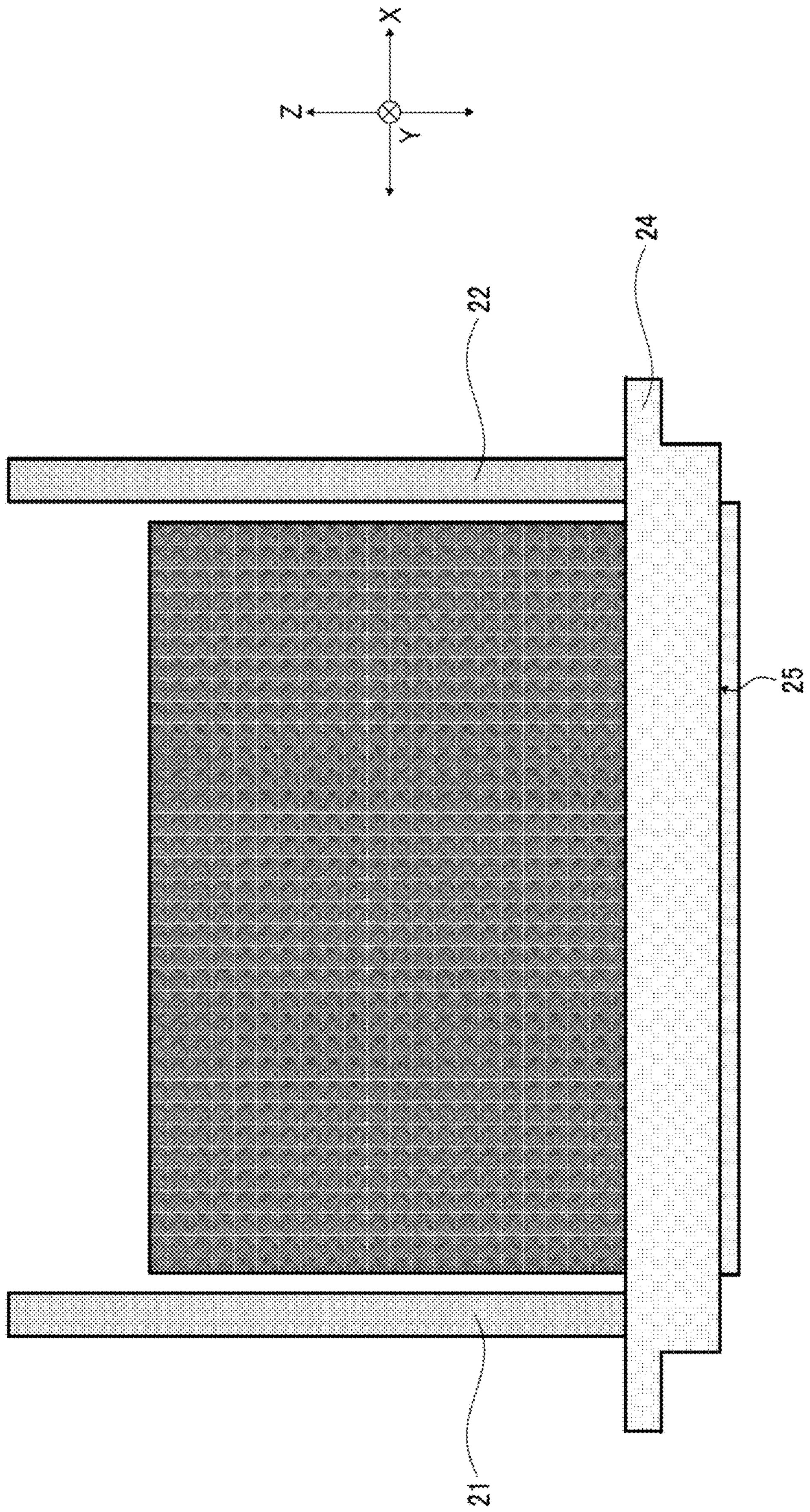
FIG. 6 is a front view of the configuration of the head.

FIG. 6 is a front view of a configuration of the head.

For example, the head illustrated in FIGS. 5 and 6 is used to discharge ink to form an image. The head frame 24 includes a supply port 21, a discharge port 22, and has a hole 23. Inside the head frame 24, the supply port 21 and the discharge port 22 are connected to a liquid chamber.

The supply port 21 supplies ink to the inside of the head.

The discharge port 22 discharges ink in the head.

The hole 23 passes a screw to fix the head to the bracket.

Multiple nozzles are arranged on the nozzle surface 25, and the ink is discharged from each of the multiple nozzles.

Mechanism Example in Carriage

The record apparatus 10 includes the following mechanism for moving the irradiator 33 in the Y-direction, in the Z-direction, and in rotating the irradiator 33 around the Y-axis.

Figure 7:
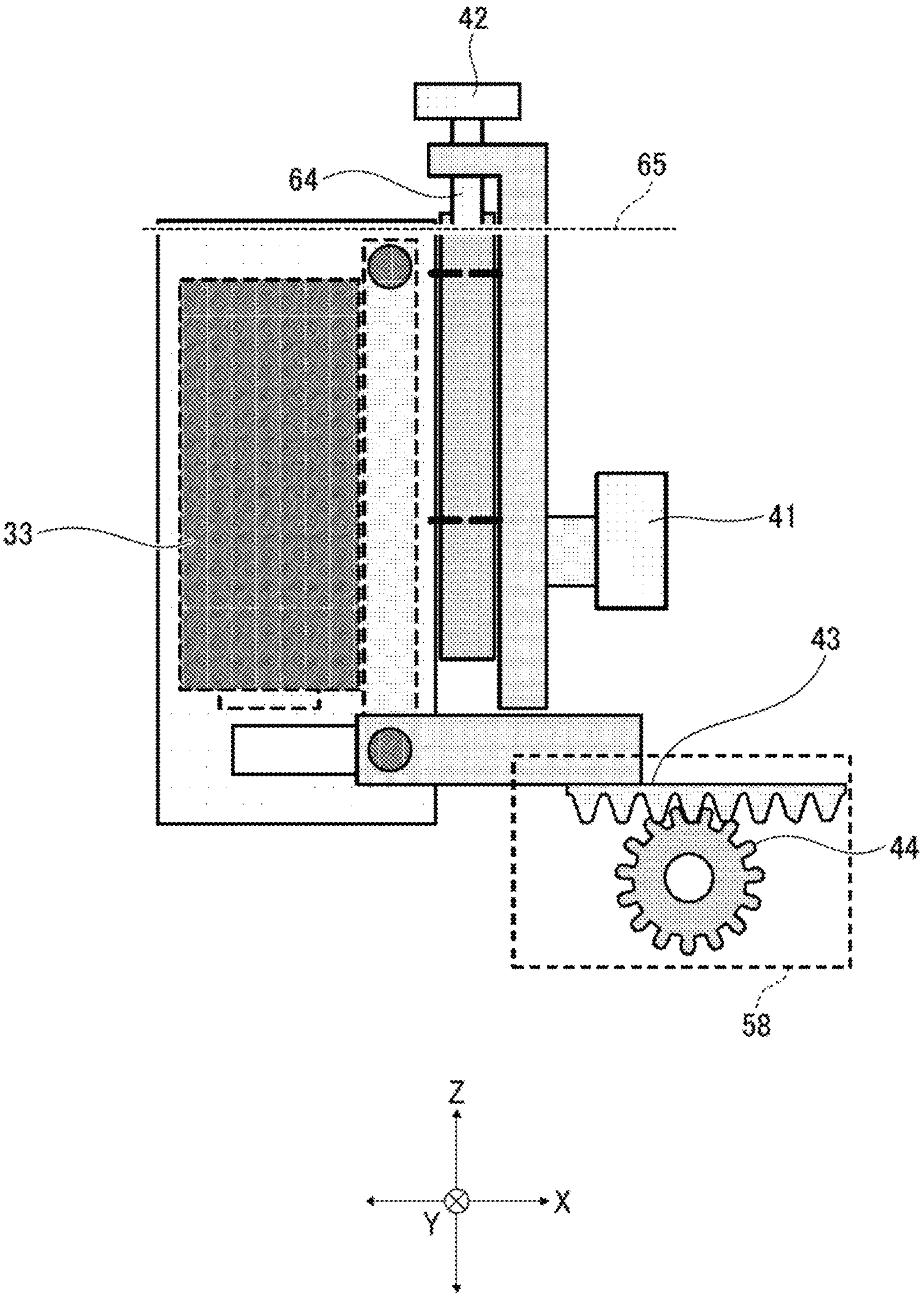
FIG. 7 is a front view of a mechanism of an irradiator inside carriage.

FIG. 7 is a front view of a mechanism of an irradiator inside carriage.

Figure 8:
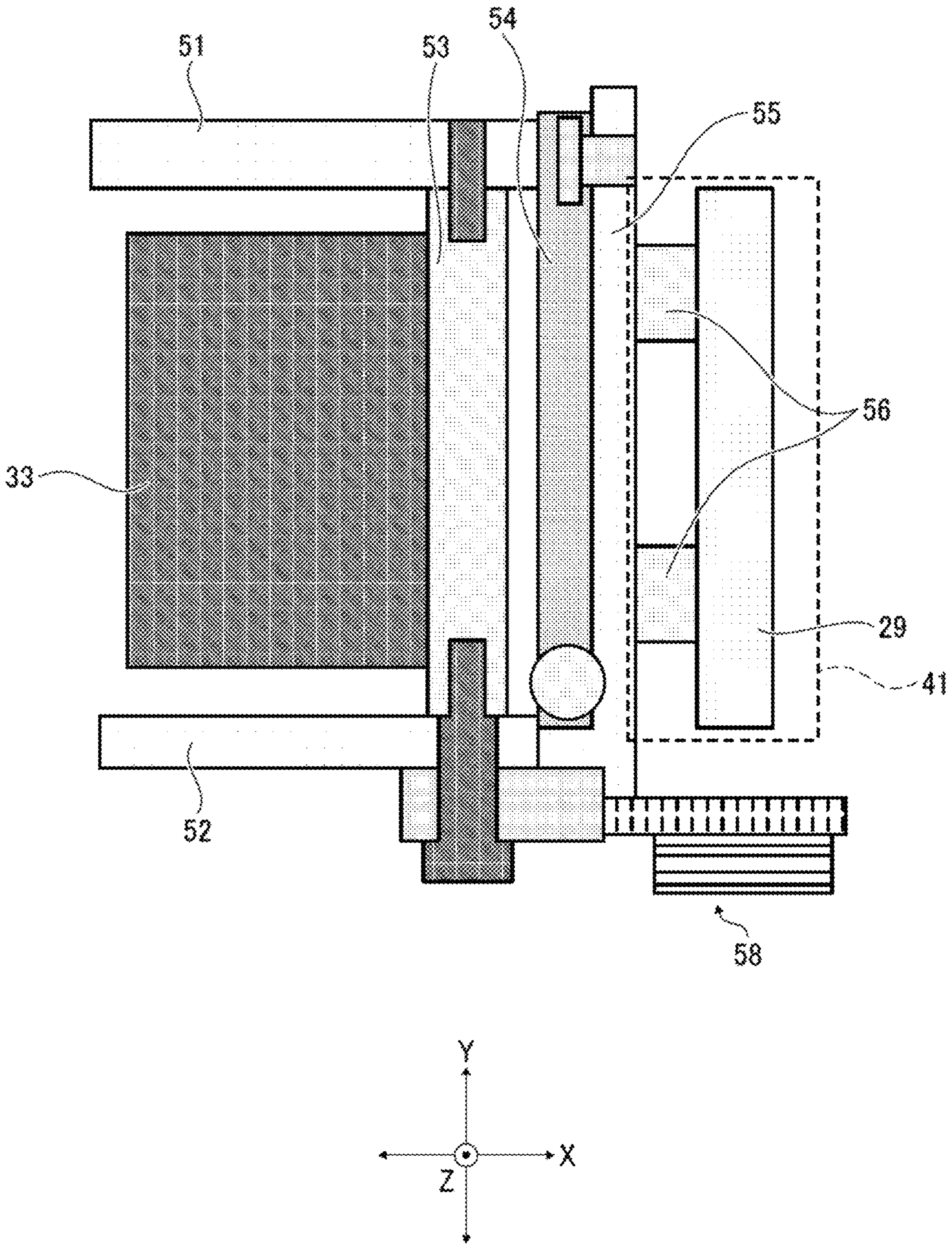
FIG. 8 is a top view of the mechanism of the irradiator inside carriage.

FIG. 8 is a top view of the mechanism of the irradiator inside carriage.

In the mechanism illustrated in FIGS. 7 and 8, the irradiator 33 is fixed to the first fix plate 53. The first fix plate 53 is fixed to the first side surface plate 51 and the second side surface plate 52.

The first side surface plate 51 and the second side surface plate 52 are fixed to the second fix plate 54. Further, the second fix plate 54 is fixed to the third fix plate 55.

A rack-and-pinion mechanism (i.e., rack-and-pinion 58) is installed on the second side surface plate 52. Specifically, the rack-and-pinion 58 is configured by a combination of a rack 43 and a pinion gear 44. The rack-and-pinion 58 is an example of a rotation mechanism (i.e., rotator) for rotating the irradiator 33 around the Y-axis.

A linear mechanism 41 (i.e., mover) for moving an irradiator 33 in the Y-direction is installed on the third fix plate 55. Specifically, the linear mechanism 41 is configured by a combination of a linear guide 56 and a guide rail 29. Further, the linear mechanism 41 is an example of a moving mechanism for parallel movement in the Y-direction (i.e., a first mover).

Specific examples of each mechanism will be described for each degree of freedom.

Example of Movement in Y-Direction by First Mover

Figure 9:
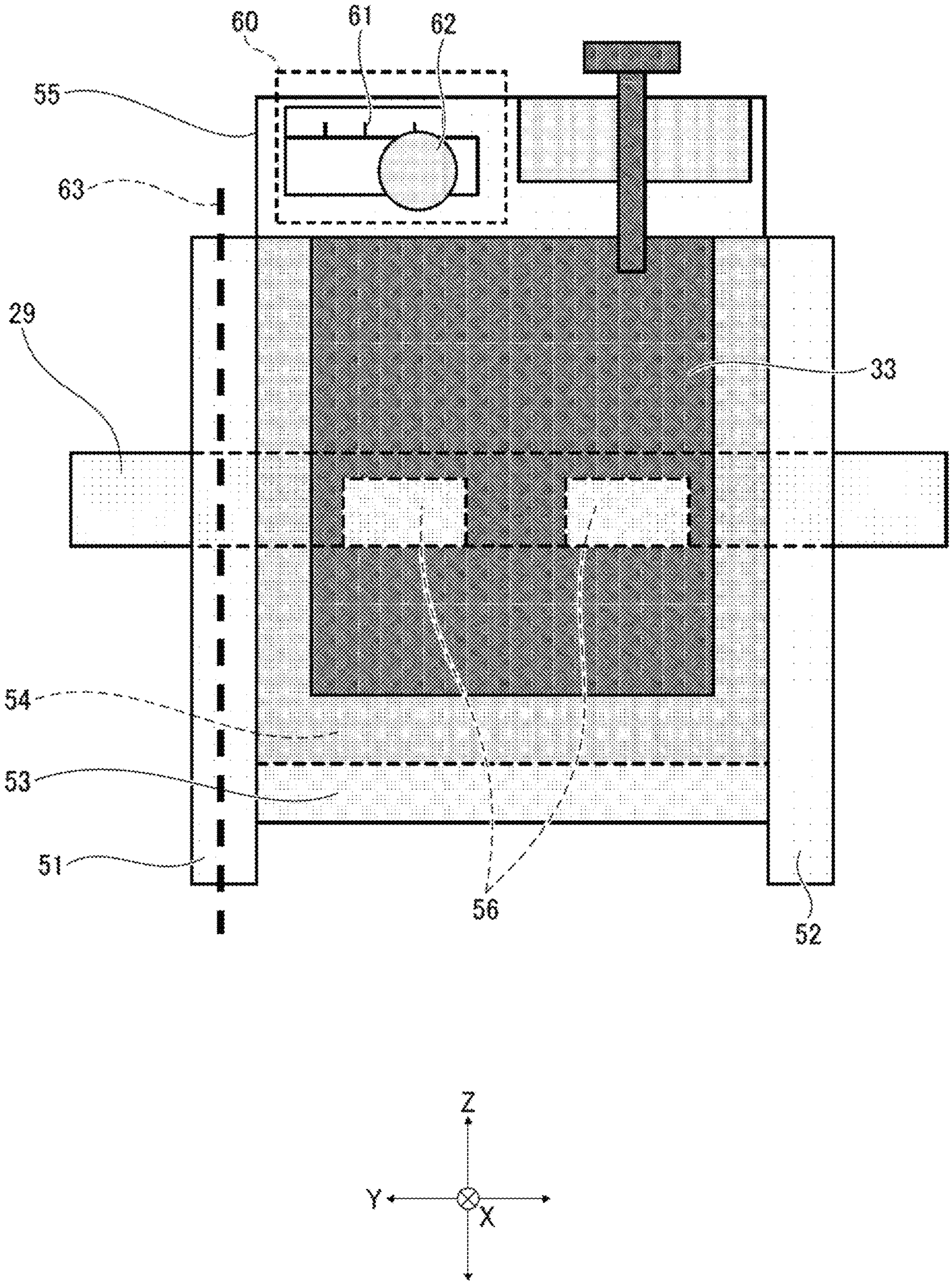
FIG. 9 is a diagram of the irradiator inside carriage at a start point in the Y-direction.

FIG. 9 is a diagram of the irradiator inside carriage at a start point in the Y-direction.

Figure 10:
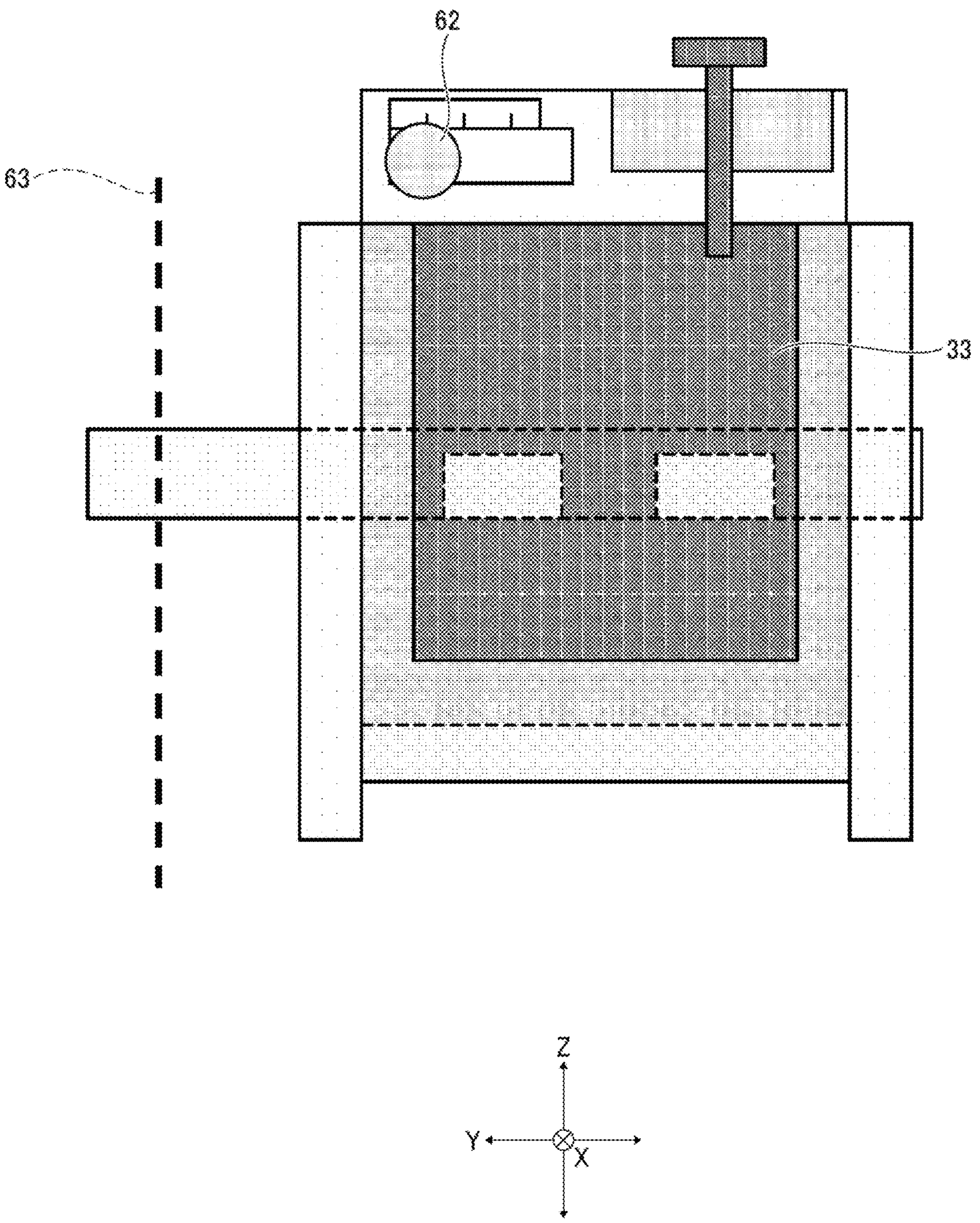
FIG. 10 is a diagram of the irradiator inside carriage after movement in the Y-direction.

FIG. 10 is a diagram of the irradiator inside carriage after movement in the Y-direction.

In a comparison of FIG. 9 and FIG. 10, the irradiator 33 moves along the guide rail 29 from the Y-axis start point 63 in the Y-direction.

The operation of parallel movement in the Y-direction is input by the first adjustment device 60, for example. Specifically, the first adjustment device 60 includes a scale 61 and a first adjustment knob 62. As described above, the first mover is a mechanism for moving the irradiator 33 in the Y-direction and an input device to which the user instructs the movement. However, the mechanism and the input device are not limited to the following examples, and other configurations may move the irradiator 33 and input the operation.

When an operation for moving the first adjustment knob 62 is input, the irradiator 33 moves in the Y-direction from the Y-axis start point 63. At the time, the value of the movement amount with the scale 61 is confirmed by the user.

Preferably, the first adjustment device 60 can move within 60 millimeters (mm) from the Y-axis start point 63. In other words, if the irradiator 33 can move within a range of about 60 mm from the Y-axis start point 63, the user can flexibly change the irradiation position in the Y-direction, and the finishing accuracy can be further increased.

In some embodiments, in the liquid discharge apparatus, the first mover moves the irradiator in the second direction within a range of 60 mm from a start point.

Example of Movement in Z-axis Direction by Second Mover

The operation of parallel movement in the Z-direction is input by the second adjustment knob 42 illustrated in FIG. 7, for example. Specifically, when the user rotates the second adjustment knob 42, the elevation shaft 64 moves and the second fix plate 54 moves in the Z-axis direction. The amount of movement along the Z-axis is determined by the number of lead of the shaft and the angle at which the second adjustment knob 42 is turned. As described above, the second mover is a mechanism for moving the irradiator 33 in the Z-direction and an input device to which the user instructs the movement. However, the mechanism and the input device are not limited to the following examples, and other configurations may move the operation of the irradiator 33 and input the operation.

Preferably, the elevation shaft 64 can be moved within ±3 mm from the Z-axis start point 65. In other words, when the irradiator 33 can move within a range of about ±3 mm from the Z-axis start point 65, the user can flexibly change the irradiation position in the Z-direction, and the finishing accuracy can be further increased.

In some embodiments, in the liquid discharge apparatus, the second mover moves the irradiator in the third direction within a range of ±3 mm from a start point.

In some embodiments, in the liquid discharge apparatus, the second mover includes a lift to elevate the irradiator, and the lift moves the irradiator in the third direction to change an irradiation range of the irradiator.

In some embodiments, in the liquid discharge apparatus, the first mover includes a linear guide in the second direction, and the first mover moves the irradiator along the linear guide in the second direction to change an irradiation position of the irradiator in the second direction.

Example of Rotation of Irradiator Around Y-Axis by Rotator

When the rack-and-pinion 58 is operated, the irradiator 33 rotates around the Y-axis as follows, for example.

Figure 11:
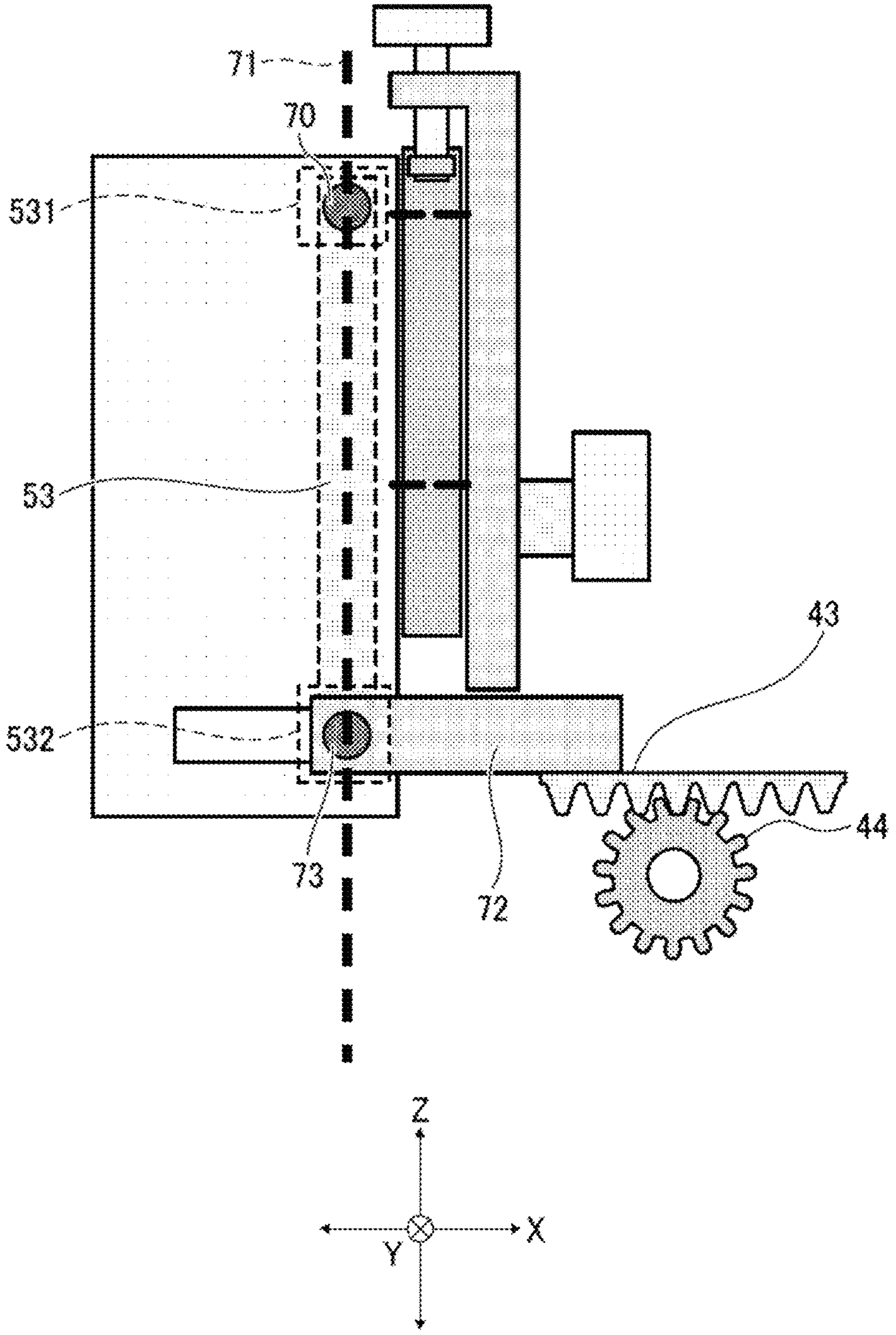
FIG. 11 is a diagram of an irradiator at a start position before rotation around the Y-axis.
Figure 12:
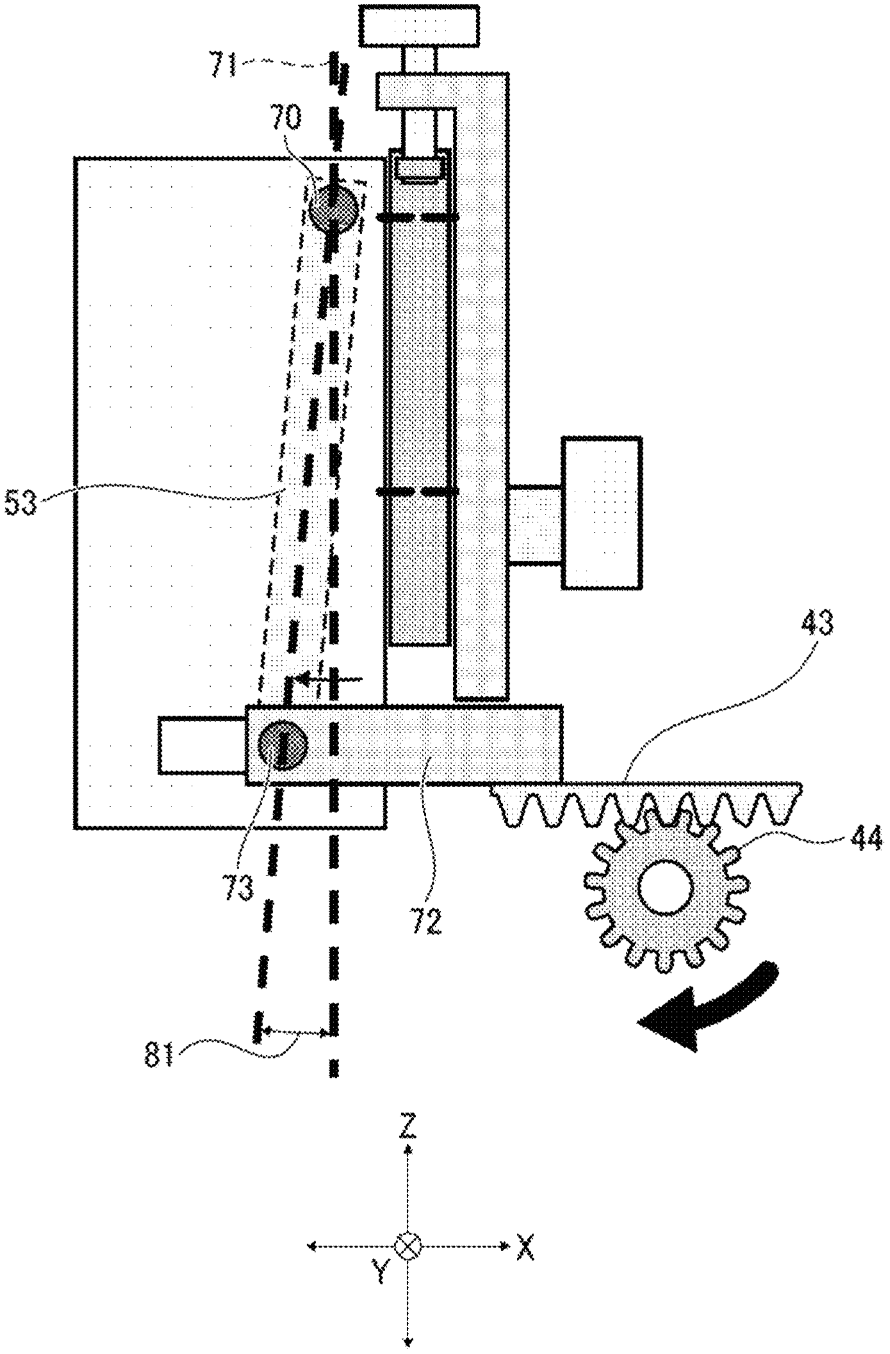
FIG. 12 is a diagram of the irradiator rotated around the Y-axis by 5 degrees.
Figure 13:
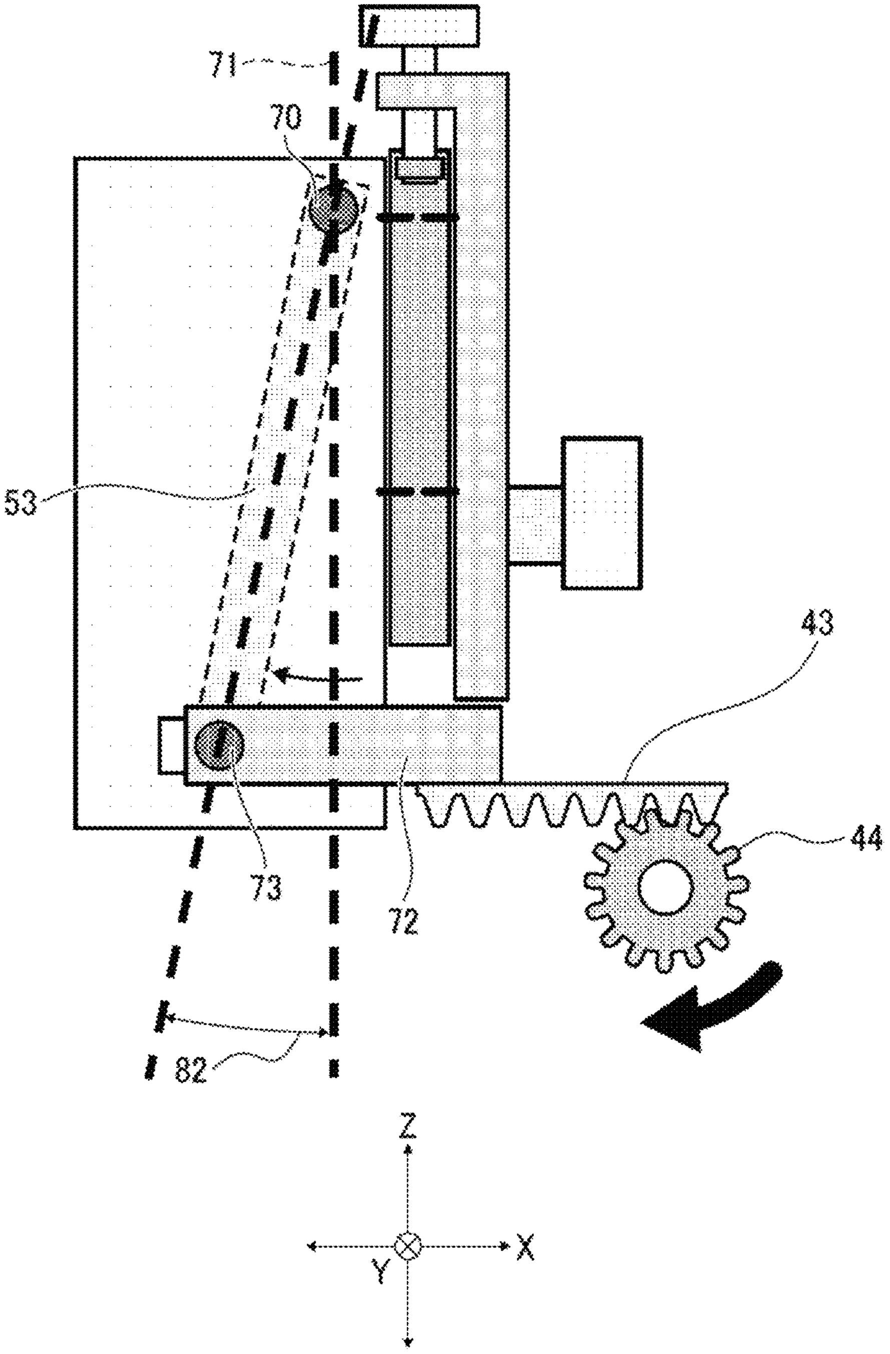
FIG. 13 is a diagram of the irradiator rotated around the Y-axis by 10 degrees.

FIG. 11 is a diagram of an irradiator at a start position before rotation around round the Y-axis. An example in which the irradiator 33 is rotated around the rotation center axis 70 will be described. The irradiator 33 is rotated with the first fix plate 53 as one body, and the movement of the first fix plate 53 is illustrated in FIGS. 11 to 13. In other words, the first fix plate 53 is a rotation plate that rotates around the rotation center axis 70.

In the following example, the first fix plate 53 rotates around an end (i.e., a first end 531) to which the rotation center axis 70 is connected. The first fix plate 53 also has a configuration in which another end opposite to the first end 531 (i.e., a second end 532) is connected to the movement plate 72.

Since the movement plate 72 is connected to the rack 43, when the rack 43 moves in the X-axis direction, the movement plate 72 moves in the X-axis direction as one body. Further, when the pinion gear 44 is rotated, the rack 43 moves in the X-axis direction. As described above, the rotator is a mechanism for rotate he irradiator 33 around Y-axis and an input device to which the user instructs the movement. However, the mechanism and the input device are not limited to the following examples, and other configurations may move the operation of the irradiator 33 and input the operation.

When the movement plate 72 moves, the second end 532 moves together with the movement plate 72 in the X-axis direction. By contrast, the first end 531 rotates around the rotation center axis 70 but does not move in the X-axis direction. Thus, when the pinion gear 44 is rotated, the irradiator 33 is rotated.

When the rotation is located at the reference 71, the angle is set to "0 degrees". FIG. 11 is a diagram of the irradiator before rotation around the Y-axis. For example, as described below, the irradiator 33 rotates around the rotation center axis 70 such as "5 degrees" or "10 degrees" with respect to the reference 71.

In some embodiments, in the liquid discharge apparatus, the rotator includes: a rotation plate mounting the irradiator and rotatable around the axis together with the irradiator; and a movement plate to move a lower end of the rotation plate in the first direction, and the rotator moves the movement plate in the first direction to rotate the rotation plate around the axis to change a time duration: from a landing of the liquid discharged from the discharger onto the surface of the record medium, to an irradiation of the ultraviolet light beam to the liquid landed on the surface of the record medium.

FIG. 12 is a diagram of the irradiator rotated around the Y-axis by 5 degrees. FIG. 12 is different from FIG. 11 in that the first fix plate 53 is rotated around the rotation center axis 70. Specifically, the angle between the first fix plate 53 and the reference 71 in the state in FIG. 12 is "5 degrees" (i.e., "a first angle 81").

When the user performs an operation of rotating the pinion gear 44, the movement plate 72 is moved, and the first fix plate 53 to which the irradiator 33 is fixed is inclined. When the user performs an operation to further rotate the pinion gear 44 from the state of the first angle 81, the following state occurs.

FIG. 13 is a diagram of the irradiator rotated around the Y-axis by 10 degrees. FIG. 13 is different from FIG. 12 in that the first fix plate 53 further rotates around the rotation center axis 70 and the angle of the first fix plate 53 is larger than the first angle 81. Specifically, the angle between the first fix plate 53 and the reference 71 in the state in FIG. 13 is "10 degrees" (i.e., "a second angle 82").

When the user further performs an operation of rotating the pinion gear 44 from the state of the first angle 81, the movement plate 72 further moves, and the first fix plate 53 to which the irradiator 33 is fixed further inclines.

Preferably, the rack-and-pinion 58 can determine an angle of 10 degrees or less from the reference 71. Specifically, as described above, it is preferable that the irradiator 33 can be rotated within a range of 10 degrees or less, such as an angle of "0 degrees" (which coincides with the reference 71), "5 degrees", and "10 degrees". Further, although the angle is determined in increments of "5 degrees" in the above example, it may be determined in increments of 5 degrees or less. Thus, the angle may be determined in an interval of "1 degree" or "2 degrees" with higher precision than 5 degrees. As described above, when the irradiator 33 can be rotated by determining the angle with an accuracy of 5 degrees or less, the user can flexibly change the irradiation position and the finishing accuracy can be further increased.

In some embodiments, in the liquid discharge apparatus, the rotator rotates the irradiator by 10 degrees or less from a reference in the third direction.

In order to prevent the irradiator 33 from changing the angle during image formation, preferably a mechanism that can fix the angle such as the stepped screw 73 may be used.

Figure 14:
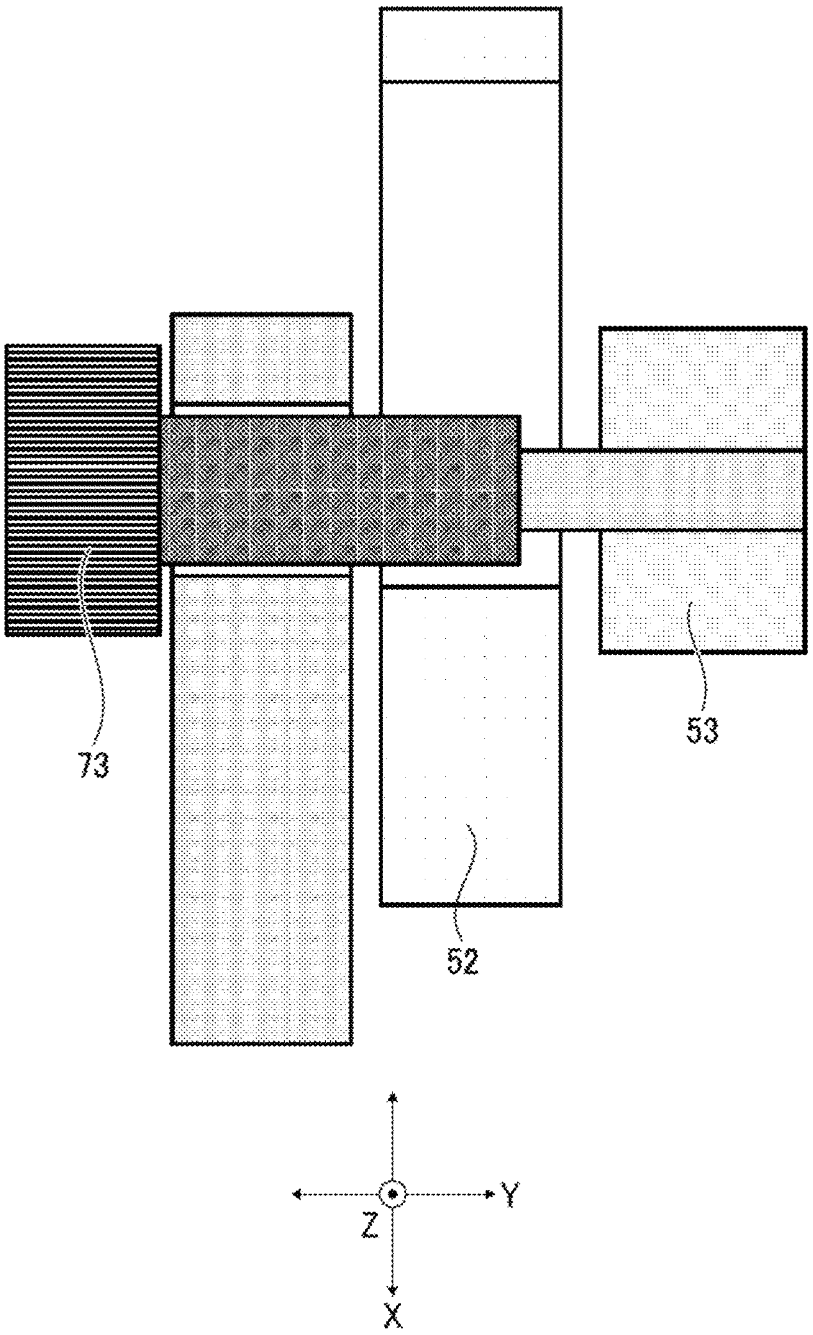
FIG. 14 is a diagram of a stepped screw removed from a fix plate.

FIG. 14 is a diagram of a stepped screw removed from a first fix plate.

Figure 15:
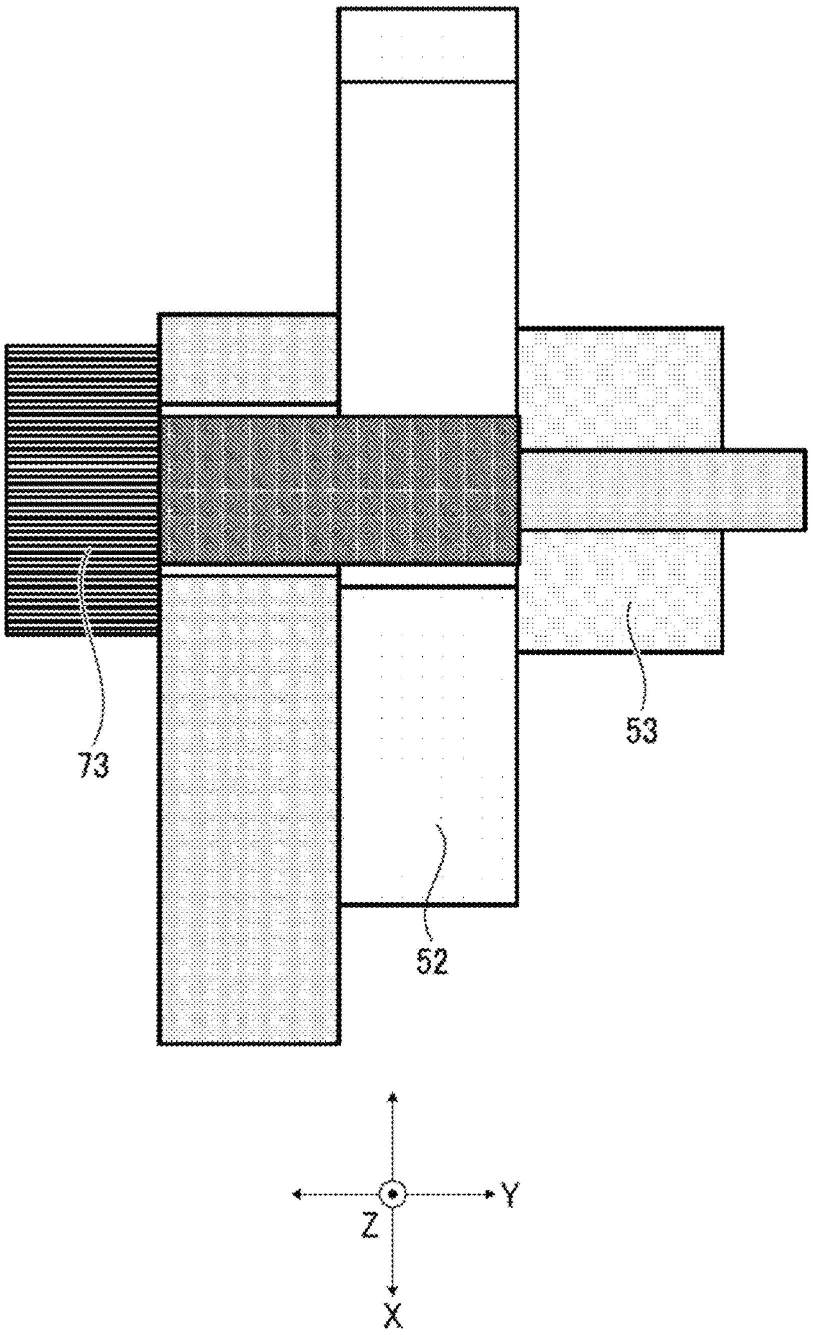
FIG. 15 is a diagram of the stepped screw fixing the fix plate.

FIG. 15 is a diagram of the stepped screw fixing the first fix plate.

As a difference, the stepped screw 73 is accommodated in the second side surface plate 52 in the configuration in FIG. 15 as compared with the configuration in FIG. 14.

As illustrated in FIG. 14, when the stepped screw 73 is removed, the first fix plate 53 is in a movable state. By contrast, as illustrated in FIG. 15, when the stepped screw 73 is accommodated in the second side surface plate 52, the position of the first fix plate 53 is fixed. As described above, when the position of the irradiator 33 can be fixed, the irradiator 33 can be prevented from moving at an unintended timing.

The fix mechanism may have another component or shape as long as it can fix the position of the irradiator 33 after rotation.

Example of Adjustment by Movement in Y-Axis Direction

Figure 16A:
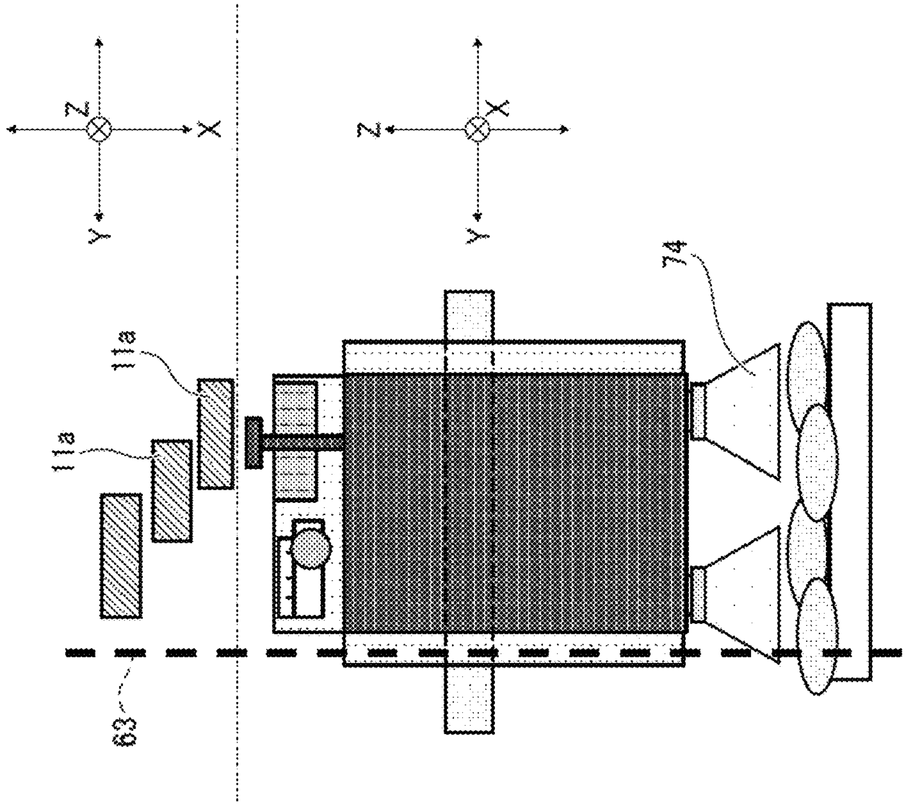
FIG. 16A is a diagram of adjustment by movement in the Y-axis direction.
Figure 16B:
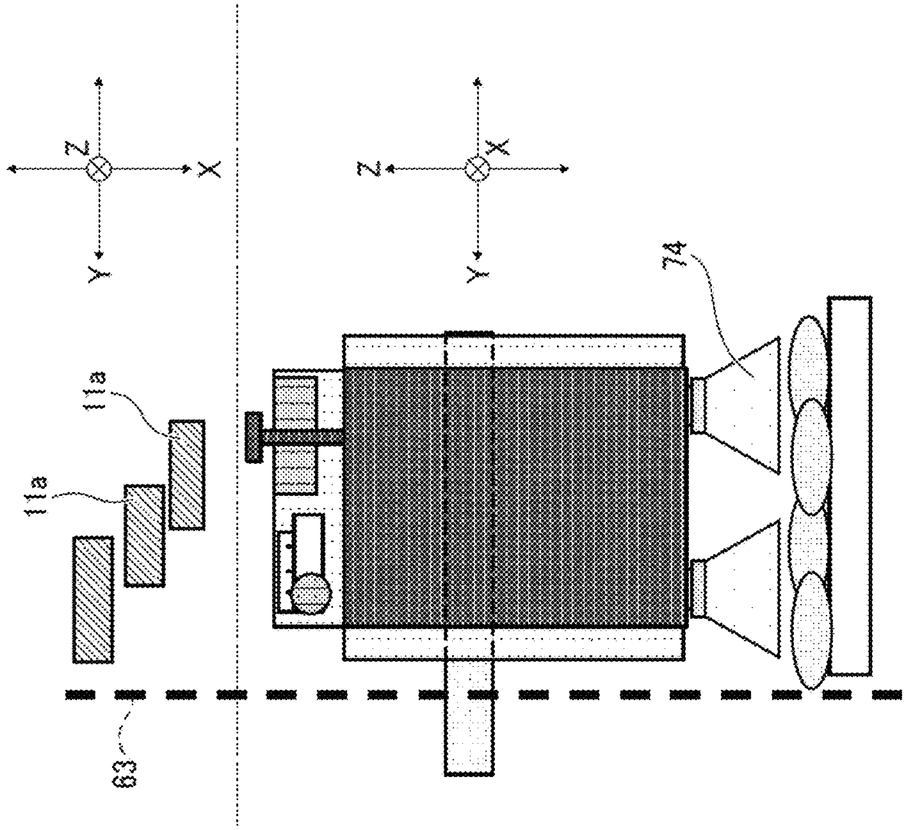
FIG. 16B is a diagram of adjustment by movement in the Y-axis direction.

FIGS. 16A and 16B are diagrams of adjustment by movement in the Y-axis direction. FIG. 16A is a diagram of the irradiator at the start point illustrated in FIG. 9, that is, a state before the irradiator 33 moves. By contrast, FIG. 16B is a diagram of the irradiator 33 is at the position illustrated in FIG. 10, that is, the state after the irradiator 33 moved.

As a difference, the position of the irradiator 33 in the configuration in FIG. 16B is changed in the Y-direction by movement as compared with the position in the configuration in FIG. 16A. As a result of such movement, the position (i.e., the irradiation range 74) of the range irradiated with ultraviolet light in the Y-axis direction can be changed.

When the irradiation range 74 can be changed with respect to the head 11*a*, the time for irradiation by the irradiator 33, that is, the time for curing the ink can be adjusted. For example, if the position of the irradiation range 74 is changed so as to delay the start timing of irradiating the ink, the start time of curing the ink can be delayed. As a result, the finishing accuracy can be increased.

Example of Adjustment by Movement in Z-Axis Direction

Figure 17B:
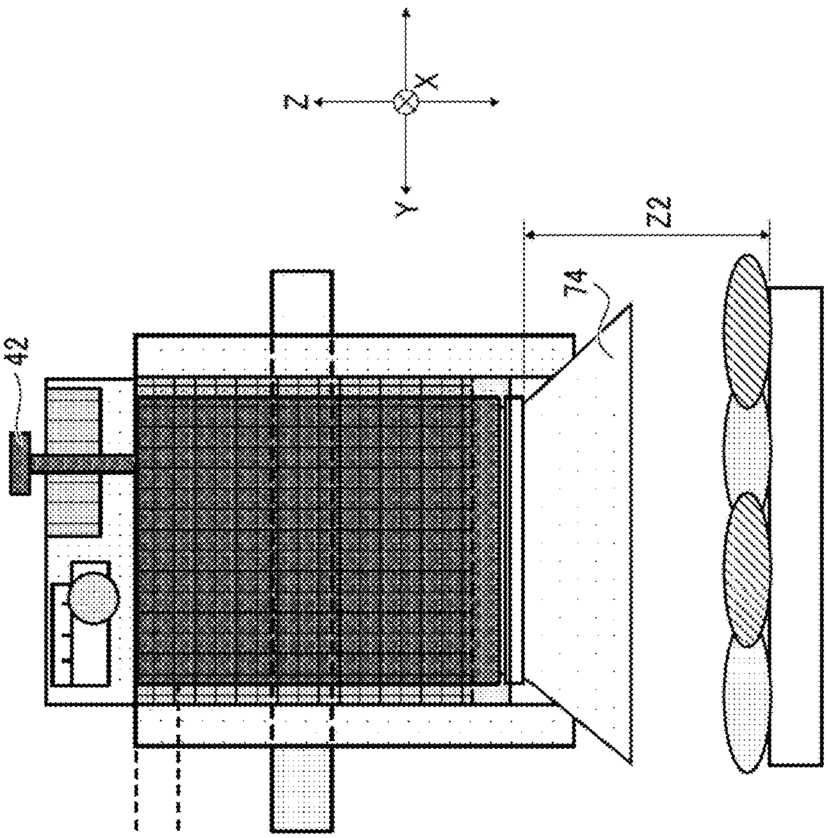
FIG. 17B is a diagram of adjustment by movement in the Z-axis direction.
Figure 17A:
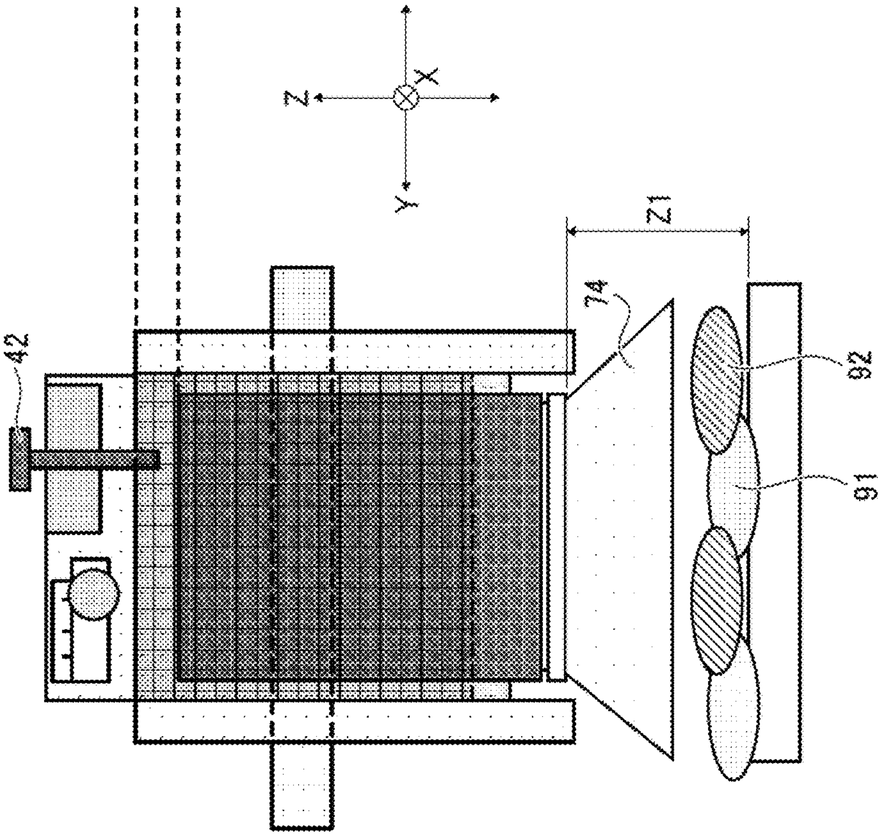
FIG. 17A is a diagram of adjustment by movement in the Z-axis direction.

FIGS. 17A and 17B are diagrams of an example of adjustment by movement in the Z-axis direction. FIG. 17A is a diagram of a state before adjustment by the second adjustment knob 42, that is, before movement of the irradiator 33. By contrast, FIG. 17B is a diagram of a state after adjustment by the second adjustment knob 42, that is, after movement of the irradiator 33.

As a difference, the position of the irradiator 33 in the configuration in FIG. 17B is changed in the Z-direction by movement as compared with the position in the configuration in FIG. 17A.

For example, the ink discharged earlier (i.e., the first ink 91) and the ink discharged later than the first ink 91 (i.e., the second ink 92) have different timings at which the inks land on the sheet. As a result, when the first ink 91 and the second ink 92 are uniformly irradiated with ultraviolet light, there may be a difference between the surface formed by the first ink 91 and the surface formed by the second ink 92 in finish. Thus, the distance between the irradiator 33 and the sheet is changed by moving the irradiator 33 in the Z-axis direction. Specifically, while the distance is "first distance Z1" in the state illustrated in FIG. 17A, the distance is "second distance Z2" in the state illustrated in FIG. 17B. Since the amounts of radiation per unit time are different between the first distance Z1 and the second distance Z2, the amount of radiation can be adjusted by changing the distance.

Accordingly, when the adjustment is performed by the movement in the Z-axis direction as described above, the time for irradiation by the irradiator 33 (i.e., the time for curing the ink) can be adjusted. As a result, the finishing accuracy can be increased.

Example of Adjustment by Rotation Around Y-Axis

Figure 18A:
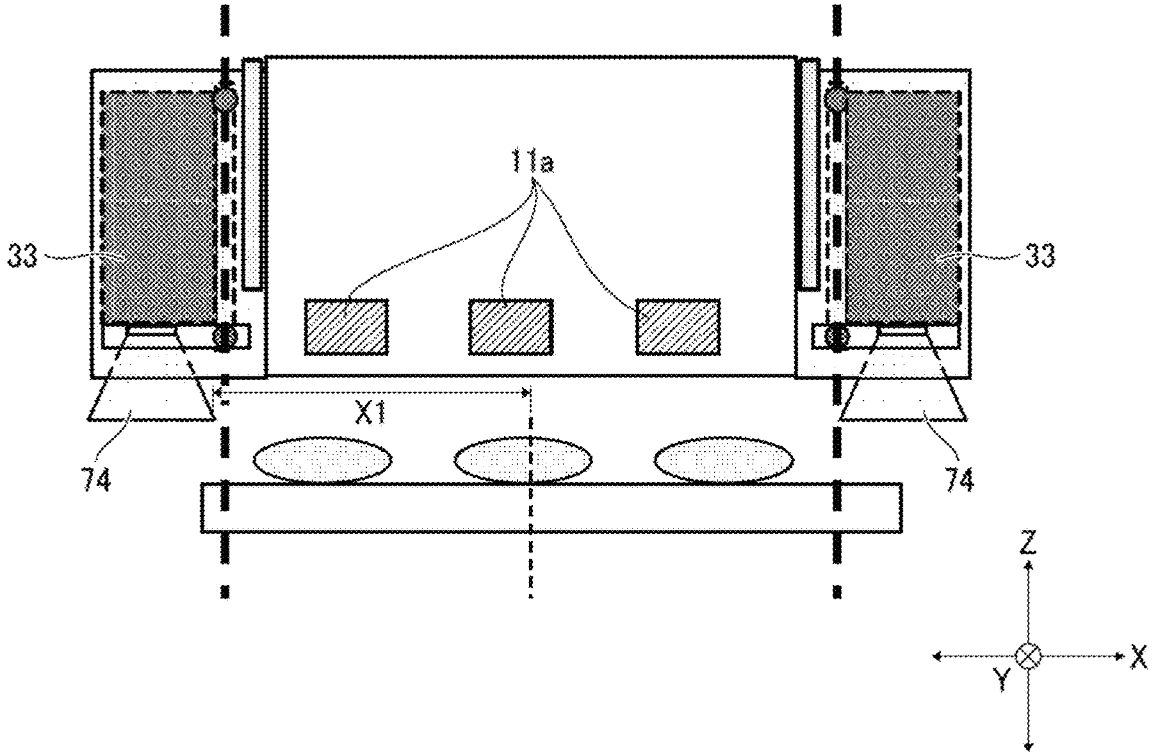
FIG. 18A is a diagram of adjustment by rotation around the Y-axis.
Figure 18B:
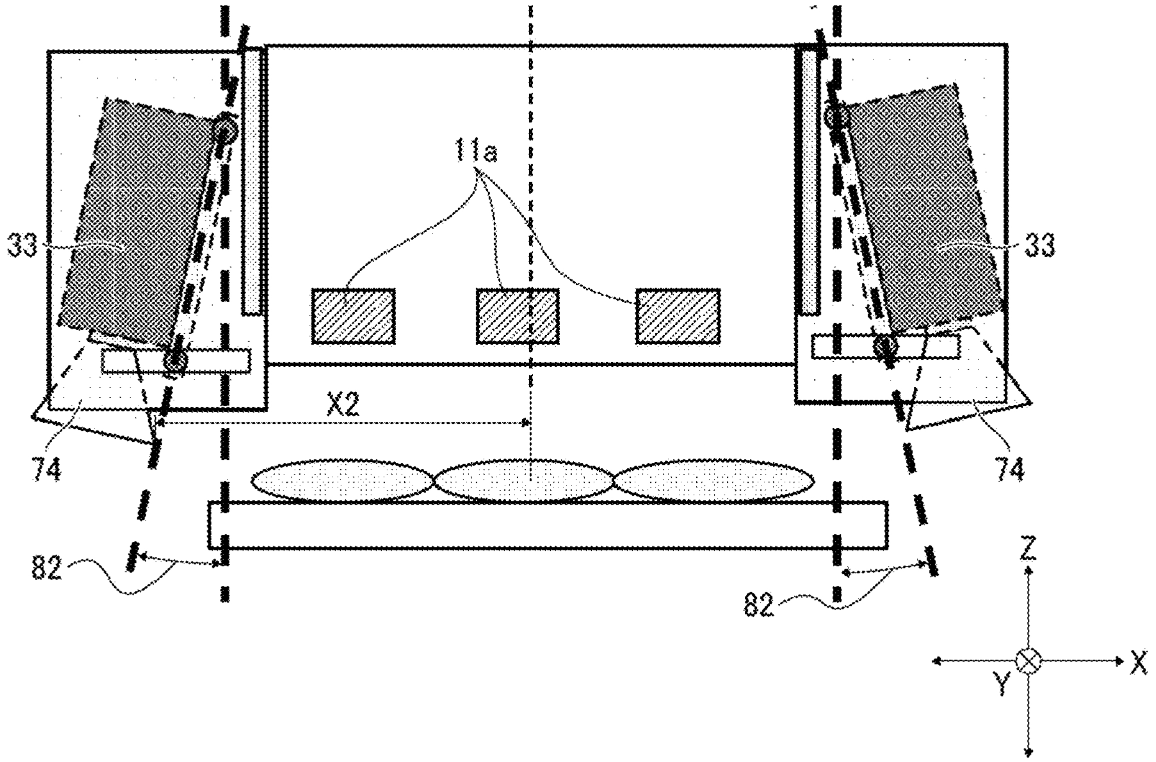
FIG. 18B is a diagram of adjustment by rotation around the Y-axis.

FIGS. 18A and 18B are diagrams of adjustment by rotation around the Y-axis. FIG. 18A is a diagram of a state before the rotation of the irradiator 33. By contrast, FIG. 18B is a diagram of a state after the rotation of the irradiator 33. FIGS. 18A and 18 B are configurations in which two irradiators 33 are symmetrically arranged with the Z-axis as an axis of symmetry. Specifically, FIG. 18A is in the same state as FIG. 11. The irradiator 33 in a state illustrated in FIG. 18A is rotated by a rotator in states illustrated in FIGS. 12 and 13, and the irradiator 33 reaches the state illustrated in FIG. 18B. Thus, the state illustrated in FIG. 18B is a state in which the irradiator 33 is rotated and tilted more than the state illustrated in FIG. 18A, and the irradiator 33 is in an inclined posture with the second angle 82.

In the state illustrated in FIG. 18A, the distance from the time when the ink is discharged and landed on the sheet to the time when the irradiation of the ultraviolet light is started is the "first transportation distance X1". On the other hand, in the state illustrated in FIG. 18B, the distance from the time when the ink is discharged and landed on the sheet to the time when the irradiation of the ultraviolet light is started is the "second transportation distance X2".

When the distance such as the first transport distance X1 and the second transport distance X2 before the irradiation of the ultraviolet light starts can be changed, the time for curing the ink can be adjusted. If the time for curing the ink can be adjusted as described above, for example, a leveling effect can be expected. As a result, the finishing accuracy can be increased.

The mechanism of the rotator described above is not limited to the configuration and shape described above. For example, an actuator, other types of mechanical components, or sensors may be used.

The ultraviolet light is reflected by, for example, the sheet to generate reflected light, or the ultraviolet light leaks from the light source depending on the position of the irradiator 33. When the head 11*a* is irradiated with these ultraviolet light, the nozzle tends to be clogged. Thus, if the position of the irradiator 33 and the irradiation position can be changed by moving or rotating the irradiator 33, the leak light and the reflected light can be reduced in accordance with the sheet, and clogging of the nozzle can be prevented.

Example of Processing Affecting Finishing Accuracy

The accuracy of finishing is affected by, for example, the following clear coat processing, or primer processing.

The clear coat processing is a process of applying a transparent ink to the printing surface to adjust the glossiness. Thus, when the clear coat process is performed, the level difference formed by image formation can be uniformed or the unevenness of gloss can be reduced. Further, reflection of excessive light can be reduced and the density of printed matter can be increased.

In the primer treatment, for example, when the adhesion between the UV ink and the record medium is poor, a "primer" serving as an adhesive for bonding the UV ink and the record medium is applied. For example, the primer may be transparent ink. When the primer can be uniformly applied in such a way, the finish of the treatment using the UV ink is increased.

In the case of image formation, the finishing accuracy is, for example, an image quality. However, the finishing accuracy may include another quality item such as manufacturing error or appearance.

The finishing accuracy can be incased by increasing the quality of pre-processing or post-processing other than the above.

Functional Configuration

Figure 19:
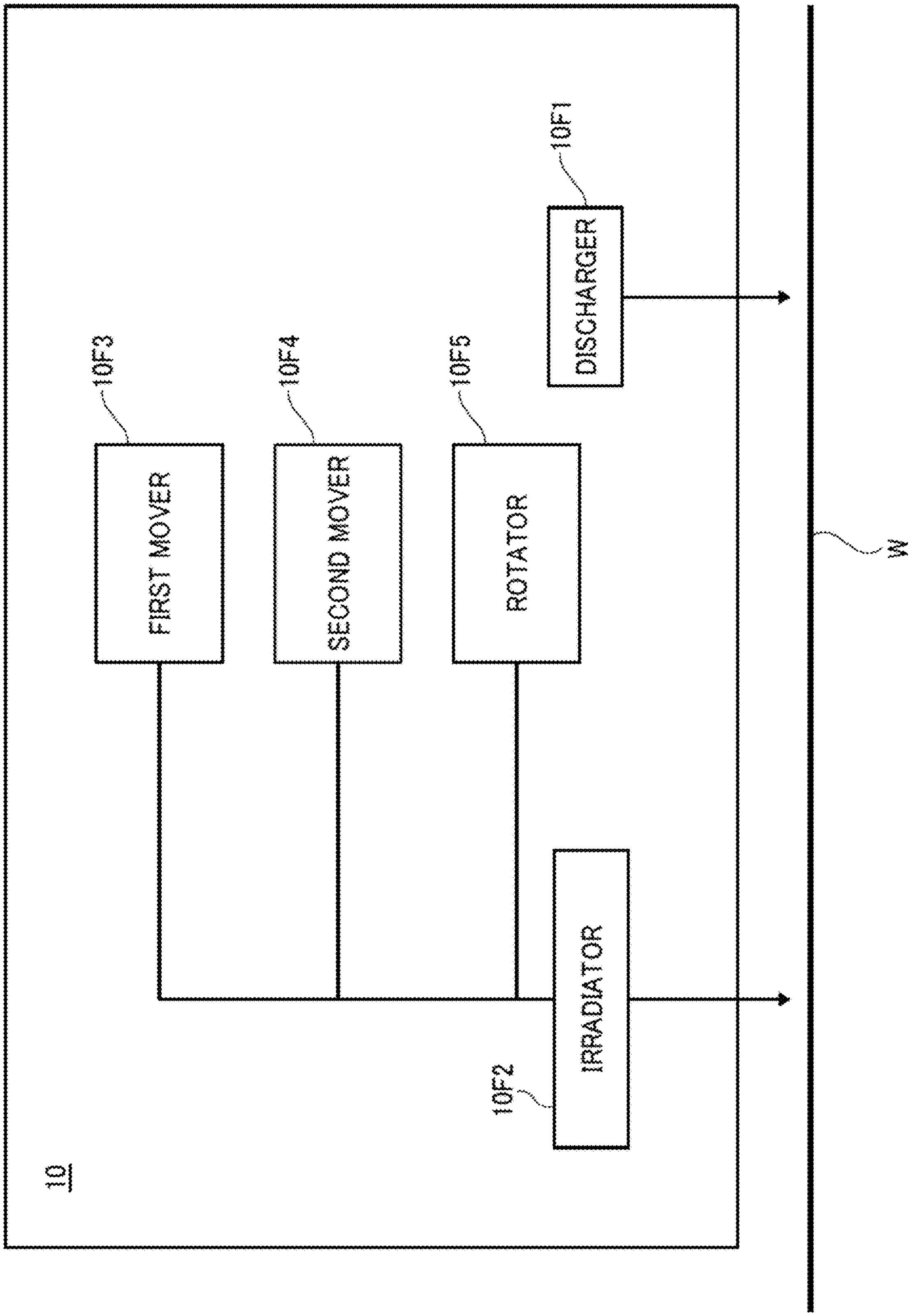
FIG. 19 is a diagram of a functional configuration.

FIG. 19 is a diagram of an example of a functional configuration. Specifically, the record apparatus 10 includes a discharger 10F1, an irradiator 10F2, a first mover 10F3, and a second mover 10F4. It is preferable that the record apparatus 10 further includes a rotator 10F5.

The discharger 10F1 performs a discharge procedure for discharging liquid to the surface of the sheet. For example, the discharger 10F1 is achieved by the head member 11.

The irradiator 10F2 performs an irradiation procedure of irradiating ultraviolet light to the liquid discharged on the sheet. For example, the irradiator 10F2 is achieved by the irradiator 33.

The first mover 10F3 performs a first movement procedure to move the irradiator 10F2 in the second direction. For example, the first mover 10F3 is achieved by the guide rail 29.

The second mover 10F4 performs a second movement procedure to move the irradiator 10F2 in the second direction. For example, the first mover 10F3 is achieved by the second adjustment knob 42.

The rotator 10F5 performs a rotation procedure to rotate the irradiator 10F2 around the first direction as an axis. For example, the rotator is achieved by a rack and pinion 58.

In some embodiments, in the liquid discharge apparatus, the discharger moves along a plane formed by the first direction and the second direction.

As described above, when the record apparatus 10 includes the first mover 10F3, the second mover 10F4, and the rotator 10F5, as illustrated in FIGS. 16 to 18, for example, the position of the irradiator 10F2 or the curing time of the ink can be adjusted by moving or rotating the irradiator 10F2. As a result, the finishing accuracy can be increased.

In some embodiments, a liquid discharge apparatus includes: a discharger to discharge liquid onto a surface of a record medium; a irradiator aligned in a first direction with the discharger, the irradiator to irradiate the liquid discharged on the record medium with an ultraviolet light beam; a first mover to move the irradiator in a second direction orthogonal to the first direction; and a second mover to move the irradiator in a third direction orthogonal to the first direction and the second direction.

The record apparatus 10 may further include an image formation member. The image formation member may have a configuration in which the discharger 10F1 performs image formation, or may have a configuration in which image formation is performed separately from the discharger 10F1.

In some embodiments, in the liquid discharge apparatus, further including an image formation member to form an image on the record medium.

Other Embodiments

The record medium is, for example, sheet (also referred to as "plain sheet"). However, the record medium may include an overhead projector sheet, a film, or a flexible thin plate in addition to coated paper and label paper other than paper. In other words, the material of the record medium may include any material to which ink droplets can be attached, temporarily attached, adhered and fixed, or adhered and penetrated. Specifically, the record medium is a record medium such as paper, film, or cloth, an electronic substrate, an electronic component such as a piezoelectric element (also referred to as a "piezoelectric member"), a powder layer (also referred to as a "powder layer"), an organ model, or an inspection cell. In addition, a three dimensional object may be formed. As described above, the material of the record medium may include thread, fiber, fabric, leather, metal, plastic, glass, wood, ceramics, or a combination thereof, to which a liquid can adhere. Further, the liquid may include record liquid, fixing liquid, or resin other than the ink according to the above-described application.

The image formation method according to the above-described procedure is achieved by causing a computer to execute processing, for example. The image formation method according to the present disclosure may include processes other than those described above. The image formation method includes a method in which a part of processing is executed by processing or operation by an external device.

Aspects of the present invention is as follows, for example.

In a first aspect, a liquid discharge apparatus includes: a discharger to discharge liquid onto a surface of a record medium; a irradiator aligned in a first direction with the discharger, the irradiator to irradiate the liquid discharged on the record medium with an ultraviolet light beam; a first mover to move the irradiator in a second direction orthogonal to the first direction; and a second mover to move the irradiator in a third direction orthogonal to the first direction and the second direction.

In a second aspect, in the liquid discharge apparatus according to the first aspect, further including a rotator to rotate the irradiator around an axis in the second direction.

In a third aspect, in the liquid discharge apparatus according to the second aspect, the first mover, the second mover, and the rotator move or rotate the irradiator for at least three degrees of freedom.

In a fourth aspect, in the liquid discharge apparatus according to any one of the first aspect to the third aspect, the first mover moves the irradiator in the second direction within a range of 60 mm from a start point.

In a fifth aspect, in the liquid discharge apparatus according to any one of the first aspect to the fourth aspect, the second mover moves the irradiator in the third direction within a range of ±3 mm from a start point.

In a sixth aspect, in the liquid discharge apparatus according to the second aspect, the rotator rotates the irradiator by 10 degrees or less from a reference in the third direction.

In a seventh aspect, in the liquid discharge apparatus according to the second aspect, the discharger moves along a plane formed by the first direction and the second direction.

In an eighth aspect, in the liquid discharge apparatus according to the second aspect, the first mover includes a linear guide in the second direction, and the first mover moves the irradiator along the linear guide in the second direction to change an irradiation position of the irradiator in the second direction.

In a ninth aspect, in the liquid discharge apparatus according to the second aspect, the second mover includes a lift to elevate the irradiator, and the lift moves the irradiator in the third direction to change an irradiation range of the irradiator.

In tenth aspect, in the liquid discharge apparatus according to the second aspect, the rotator includes: a rotation plate mounting the irradiator and rotatable around the axis together with the irradiator; and a movement plate to move a lower end of the rotation plate in the first direction, and the rotator moves the movement plate in the first direction to rotate the rotation plate around the axis to change a time duration: from a landing of the liquid discharged from the discharger onto the surface of the record medium, to an irradiation of the ultraviolet light beam to the liquid landed on the surface of the record medium.

In an eleventh aspect, in the liquid discharge apparatus according to any one of the first aspect to the tenth aspect, further including an image formation member to form an image on the record medium.

In an eleventh aspect, in the liquid discharge apparatus according to any one of the first aspect to the tenth aspect, further including an image formation member to form an image on the record medium.

The present disclosure is not limited to the above-describe embodiments, and can be modified in several ways. Accordingly, the present invention is capable of structural request addition or modification without departing from the technical gist. The present disclosure is not limited to specific embodiments described above, and numerous additional modifications and variations are possible in light of the teachings within the technical scope of the appended claims. The above-described exemplary embodiment is a specific example suitable for implementation. Such embodiments and variations thereof are included in the scope and gist of the embodiments of the present disclosure and are included in the embodiments described in claims and the equivalent scope thereof.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A liquid discharge apparatus comprising:
- a discharger to discharge liquid onto a surface of a record medium;
- a irradiator aligned in a first direction with the discharger, the irradiator to irradiate the liquid discharged on the record medium with an ultraviolet light beam;
- a first mover to move the irradiator in a second direction orthogonal to the first direction; and
- a second mover to move the irradiator in a third direction orthogonal to the first direction and the second direction.

2. The liquid discharge apparatus according to claim 1, further comprising a rotator to rotate the irradiator around an axis in the second direction.

3. The liquid discharge apparatus according to claim 2, wherein the first mover, the second mover, and the rotator move or rotate the irradiator for at least three degrees of freedom.

4. The liquid discharge apparatus according to claim 2, wherein the rotator rotates the irradiator by 10 degrees or less from a reference in the third direction.

5. The liquid discharge apparatus according to claim 2, wherein the discharger moves along a plane formed by the first direction and the second direction.

6. The liquid discharge apparatus according to claim 2, wherein the first mover includes a linear guide in the second direction, and
- the first mover moves the irradiator along the linear guide in the second direction to change an irradiation position of the irradiator in the second direction.

7. The liquid discharge apparatus according to claim 2, wherein the second mover includes a lift to elevate the irradiator, and
- the lift moves the irradiator in the third direction to change an irradiation range of the irradiator.

8. The liquid discharge apparatus according to claim 2, wherein the rotator includes:
- a rotation plate mounting the irradiator and rotatable around the axis together with the irradiator; and
- a movement plate to move a lower end of the rotation plate in the first direction, and
- the rotator moves the movement plate in the first direction to rotate the rotation plate around the axis to change a time duration:
- from a landing of the liquid discharged from the discharger onto the surface of the record medium,
- to an irradiation of the ultraviolet light beam to the liquid landed on the surface of the record medium.

9. The liquid discharge apparatus according to claim 1, wherein the first mover moves the irradiator in the second direction within a range of 60 mm from a start point.

10. The liquid discharge apparatus according to claim 1, wherein the second mover moves the irradiator in the third direction within a range of ±3 mm from a start point.

11. The liquid discharge apparatus according to claim 1, further comprising an image formation member to form an image on the record medium.

* * * * *